United States Patent
Zoppas et al.

(10) Patent No.: US 9,878,482 B2
(45) Date of Patent: Jan. 30, 2018

(54) APPARATUS FOR CONVEYING CONTAINERS MADE OF PLASTIC MATERIAL

(71) Applicant: S.I.P.A. SOCIETA' INDUSTRIALIZZAZIONE PROGETTAZIONE E AUTOMAZIONE, Vittorio Veneto (IT)

(72) Inventors: Matteo Zoppas, Conegliano (IT); Ernesto Eusebione, Mareno di Piave (IT); Franco Cavallini, Treviso (IT); Matteo Segat, Vittorio Veneto (IT)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 0 days.

(21) Appl. No.: 15/314,241

(22) PCT Filed: May 27, 2015

(86) PCT No.: PCT/IB2015/053964
§ 371 (c)(1),
(2) Date: Nov. 28, 2016

(87) PCT Pub. No.: WO2015/181738
PCT Pub. Date: Dec. 3, 2015

(65) Prior Publication Data
US 2017/0095962 A1  Apr. 6, 2017

(30) Foreign Application Priority Data

May 28, 2014  (IT) .............................. RM2014A0282

(51) Int. Cl.
*B65G 47/84* (2006.01)
*B29C 49/42* (2006.01)
(Continued)

(52) U.S. Cl.
CPC ...... *B29C 49/4205* (2013.01); *B29C 49/6409* (2013.01); *B65G 17/12* (2013.01);
(Continued)

(58) Field of Classification Search
CPC ...... B65G 17/323; B65G 17/20; B65G 17/42; B65G 17/46; B65G 47/841; B65G 47/842;
(Continued)

(56) References Cited

U.S. PATENT DOCUMENTS 4,082,175 A * 4/1978 Gibbemeyer ....... B29C 49/4205
198/377.02
4,572,355 A * 2/1986 Hunter ................ B29C 49/4205
198/803.12
(Continued)

*Primary Examiner* — James R Bidwell
(74) *Attorney, Agent, or Firm* — Abelman, Frayne & Schwab

(57) ABSTRACT

An apparatus for conveying a container made of plastic material comprising a supporting frame (3), sliding along a predetermined path; a longitudinal rod (20), defining an axis (X), adapted to translate along axis (X) and/or to rotate about axis (X) through guide-holes (24', 25') provided in the supporting frame; a gripping device (22), fixed to the longitudinal rod, for picking and withholding an end of the container to be conveyed; wherein the translation strokes of the longitudinal rod (20) and of the gripping device (22) can be adjusted along axis (X) so that the gripping device (22) can operate at three working levels or positions: a resting position (L0), a gripping position (L1) and a releasing position (L2).

19 Claims, 6 Drawing Sheets

(51) Int. Cl.
  *B29C 49/64* (2006.01)
  *B65G 17/12* (2006.01)
  *B65G 17/32* (2006.01)
  *B29K 105/00* (2006.01)
  *B29K 667/00* (2006.01)
  *B29L 31/00* (2006.01)

(52) U.S. Cl.
  CPC ...... *B65G 17/323* (2013.01); *B29K 2105/253* (2013.01); *B29K 2667/003* (2013.01); *B29L 2031/712* (2013.01)

(58) Field of Classification Search
  CPC .......... B65G 2201/0244; B65G 47/901; B29C 49/42; B29C 49/48; B29C 49/4205
  USPC .............. 198/377.02, 470.1, 867.09, 803.12
  See application file for complete search history.

(56) References Cited

U.S. PATENT DOCUMENTS

| | | | |
|---|---|---|---|
| 6,471,038 B1 * | 10/2002 | Yung | B29C 49/4205 198/803.12 |
| 6,761,556 B1 * | 7/2004 | Pellegatta | B29C 49/4205 198/803.12 |
| 6,811,389 B1 * | 11/2004 | Guiffant | B29C 49/68 198/803.12 |
| 7,008,125 B2 * | 3/2006 | Nunokawa | B41J 11/009 347/215 |
| 8,567,589 B2 * | 10/2013 | Schonberger | B29C 49/4205 198/803.12 |
| 8,640,860 B2 * | 2/2014 | Leroux | B29C 49/4205 198/803.12 |
| 9,067,742 B2 * | 6/2015 | Duclos | B23Q 1/00 |

\* cited by examiner

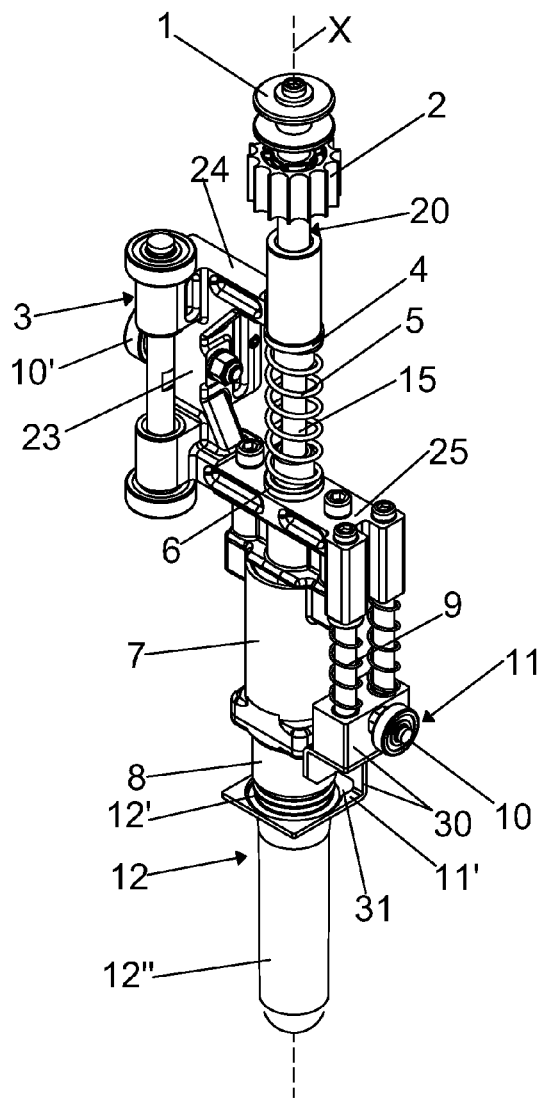
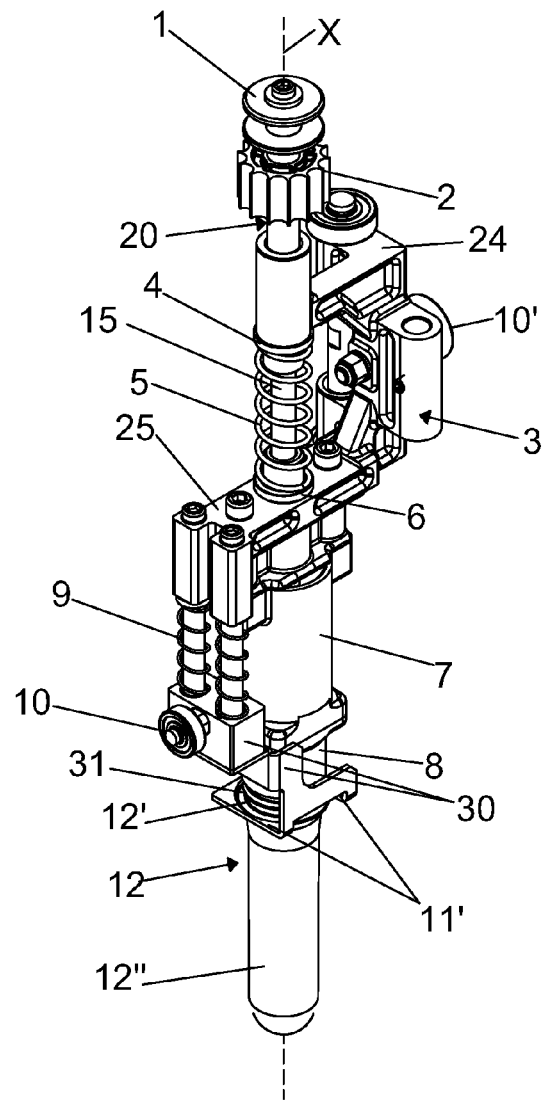
Fig. 1
Fig. 2

APPARATUS FOR CONVEYING CONTAINERS MADE OF PLASTIC MATERIAL

CROSS REFERENCE TO RELATED APPLICATION

This application claims benefit under 35 U.S.C. § 371 to international application No. PCT/IB2015/053964, filed on May 27, 2015, which claims priority to Italian application no. RM2014A000282, filed May 28, 2014, the contents of which are incorporated by reference in their entireties.

FIELD OF THE INVENTION

The present invention relates to an apparatus for conveying containers made of plastic material, for example preforms made of thermoplastic material, such as PET or any other suitable material, used in blow molding processes, for example drawing-blowing processes.

STATE OF THE ART

Different types of conveying apparatuses for containers made of plastic material are known. In particular, conveying apparatuses are known of substantially cylindrical-shaped preforms made of thermoplastic material, for conveying said preforms along a predetermined path within a blow molding system of the final containers.

Generally a chain, on which "n" conveying apparatuses are fixed, moves along said path by crossing at least one thermal treatment zone of the preforms so that the latter reach an optimal temperature in view of the subsequent blow molding or drawing-blowing step.

Known conveying apparatuses work along said path only at two height levels or heights, and the insertion of the preforms onto said apparatuses and the subsequent extraction from said apparatuses are not entirely simple operations.

Thus the need is felt to make an innovative apparatus for conveying containers made of plastic material which allows overcoming the aforesaid drawbacks.

SUMMARY OF THE INVENTION

It is the primary object of the present invention to make an apparatus for conveying containers made of plastic material which is more efficient than the conveying apparatuses currently on the market.

Not less importantly, it is a further object of the invention to make an apparatus for conveying containers that has a smaller number of components than the number of components of known apparatuses.

Therefore, the present invention proposes to achieve the above objects by making an apparatus for conveying a container made of plastic material, in particular a preform for the production of a final container by means of a blowing operation, the apparatus comprising:

- a supporting frame, slidable along a predetermined path, having a first arm and a second arm provided with a first guide-hole and a second guide-hole, respectively;
- a longitudinal rod defining an axis X, adapted to translate along said axis X and/or to rotate about said axis X through said first guide-hole and second guide-hole coaxial to axis X;
- a gripping device, fixed to a first end of the longitudinal rod, for picking and withholding an end of the container to be conveyed;

wherein there are provided adjustment means for adjusting the translation strokes of the longitudinal rod and of the gripping device along said axis X, said translation strokes having a predetermined maximum length, said adjustment means being configured to allow a first downward translation of the gripping device, having a first stroke $c_1$ from a resting position $L_0$ to a gripping position $L_1$ in which the container is gripped by means of said gripping device; a second translation of the gripping device together with the container upwards from said gripping position $L_1$ to said resting position $L_0$; and a third upwards translation of the gripping device, having a second stroke $c_2$ from said resting position $L_0$ to a releasing position $L_2$ for releasing the container from said gripping device.

According to another aspect of the invention, a conveying chain of containers made of plastic material comprising a plurality of links is provided, according to claim 17, each of said links being provided with at least one conveying apparatus according to the invention.

A further aspect of the invention relates to an operating method of said conveying apparatus, which, according to claim 18, comprises the following steps:

a) providing the longitudinal rod in the resting position $L_0$;

b) translating the longitudinal rod along axis X downwards from said resting position $L_0$ to the gripping position $L_1$ in which container 12 is gripped by the gripping device;

c) translating the longitudinal rod along axis X upwards from said gripping position $L_1$ to said resting position $L_0$;

d) translating the longitudinal rod along axis X upwards from said resting position $L_0$ to the releasing position $L_2$ to release the container from said gripping device.

Thus, when operating the conveying apparatus according to the present invention, advantageously there are provided at least three working levels, which are:

- a gripping level $L_1$, in which the gripping device is inserted inside the upper part of the container to be conveyed;
- a resting level $L_0$ in which the aforesaid container is upheld and withheld by the gripping device;
- a releasing level $L_2$, in which the gripping device moves upwards thus releasing the container.

In a preferred embodiment, the conveying apparatus according to the present invention works only at these three working levels $L_1$, $L_0$ and $L_2$.

All known conveying apparatuses currently in machines and drawing-blowing processes instead only work at two levels because the resting level is caused to coincide with one of the other two levels (gripping or releasing level). The use of three different working levels combined with a vertical movement of a possible moveable protection device of the neck of the container has the advantage of an easier insertion and picking of the containers with respect to certain solutions of the known art.

A further innovative element lies in the working mode of the two annular elements, crossed by the rod and arranged coaxially outside a central portion of said rod, and of the first elastic means arranged between said annular elements. Indeed, the first elastic means are designed to cause a single movement each time equal to value $c_1$ if the movement of the rod is directed downward from the resting position or level $L_0$, and equal to value $c_2$ if the movement of the rod is directed upwards from the resting position or level $L_0$. The resting points of the first elastic means and of the annular elements change for each upwards or downward movement, thus adapting to the inner surface of the upper or lower arm of the supporting frame and to the abutments of the longitudinal rod which delimit the central portion thereof. The first elastic means are sized for a maximum deformation $c_{max}$ equal to value c1 or c2, according to the greater of the two values, and not for a value equal to c1+c2. In one variant, it is possible for value c1 to be equal to value c2. The sole function of the first elastic means is only to maintain the longitudinal rod in position at the resting level L0.

One advantageous variant of the apparatus of the invention has the advantage of having a smaller number of components. It in fact includes the possibility of using the conveying apparatus without an expulsion device, known in technical jargon as head expulsion sleeve. Such an expulsion device indeed comprises at least one tubular element inside of which an inner guide element slides, fixed at the lower end of the longitudinal rod, for axially and radially guiding the longitudinal rod and the chuck or gripping device of the preform, which are to be perfectly centered with respect to said tubular element to avoid contacts between the various metal parts. In the case of conveying apparatus without expulsion device, that is without outer tubular elements and inner guide element, the container is released from the gripping device, which is inserted inside the neck due to the effect of the holding force exerted, for example, by a lateral gripping pincer which acts outside the neck of the container, said gripping pincer being part of a wheel for transferring containers.

It is instead suitable to provide the aforesaid expulsion device when preforms have complex necks with a limited gripping zone for the pincers. In these cases, extracting the preforms from the gripping device only using the pincer could indeed be critical.

However, there is in any event an advantage when considering one variant of the invention provided with the inner guide element and the relative outer tubular elements because, with respect to known solutions which provide the expulsion device and only two working positions or levels of the gripping device, there is no need according to the invention, for the expulsion device to always be flush with the upper part of the neck of the container, therefore problems are avoided of the preform going under the gripping device at a high speed also in the case in which the preform is not perfectly stable and tends to oscillate. Indeed, the preform typically rests with the grip ring at the gripping level L1 in known solutions; the expulsion device is flush with the upper part of the neck of the preform; the gripping device, or chuck, starts from the resting level L0 and is lowered to pick the preform at the gripping level L1; then the gripping device rises to the resting level L0 for the expulsion of the preform, which is unloaded by being knocked against the lower end of the expulsion device. Since the preform does not move with respect to the expulsion device in this known configuration, there is a need for the sleeve or expulsion device to always be flush with the upper part of the neck.

The dependent claims describe preferred embodiments of the invention, thus forming an integral part of the present description.

BRIEF DESCRIPTION OF THE FIGURES

Further features and advantages of the invention will be more apparent in the light of the detailed description of a preferred, but not exclusive, embodiment of an apparatus for conveying containers made of plastic material, shown by way of non-limiting example, with the aid of the accompanying drawings in which:

FIG. 1 depicts a first perspective view of a first embodiment of the apparatus according to the present invention;

FIG. 2 depicts a second perspective view of the apparatus in FIG. 1;

The same reference numerals in the drawings identify the same elements or components.

DETAILED DESCRIPTION OF PREFERRED EMBODIMENTS OF THE INVENTION

Figure 3:
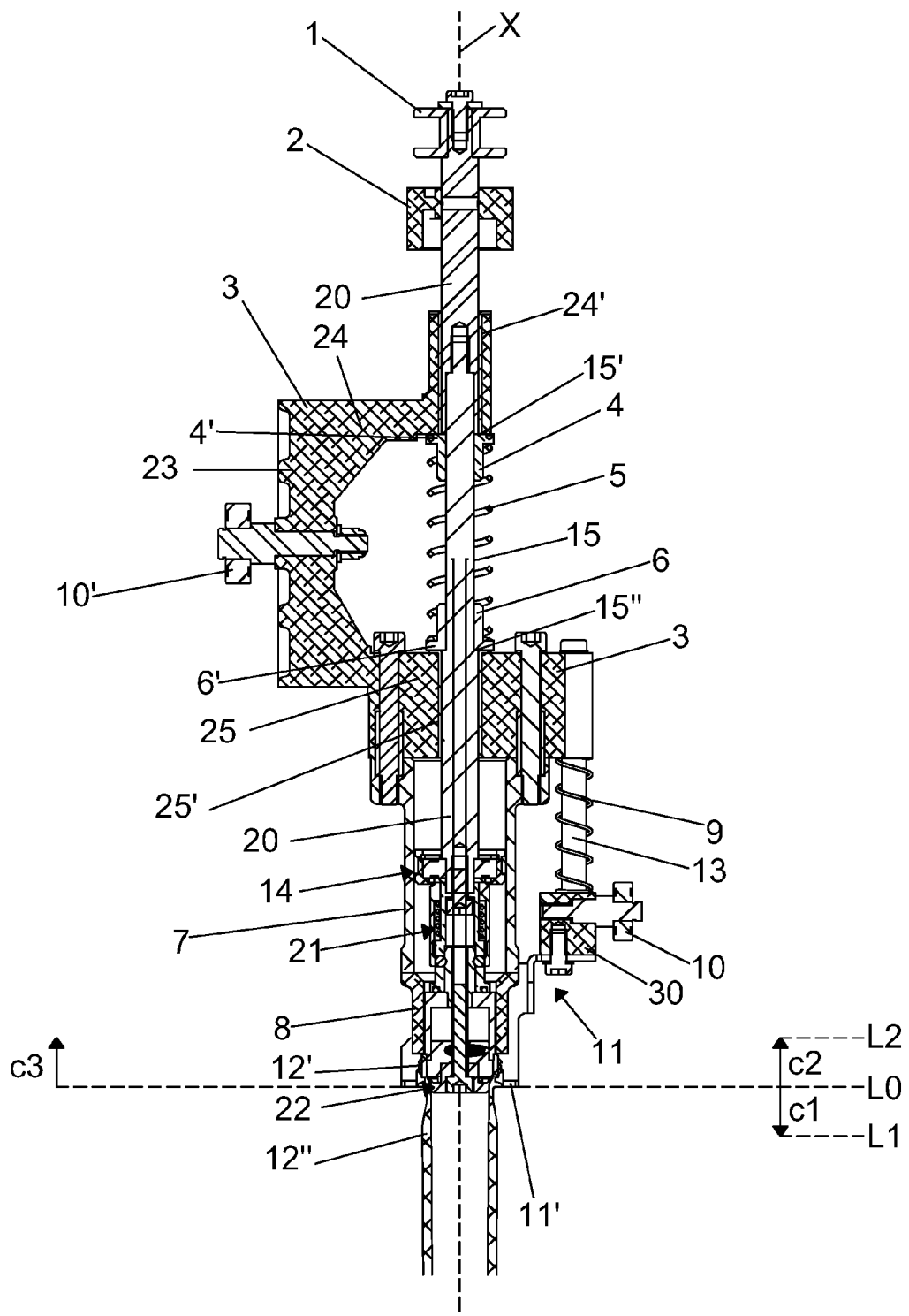
FIG. 3 depicts a sectional view of the apparatus in FIG. 1.
Figure 4:
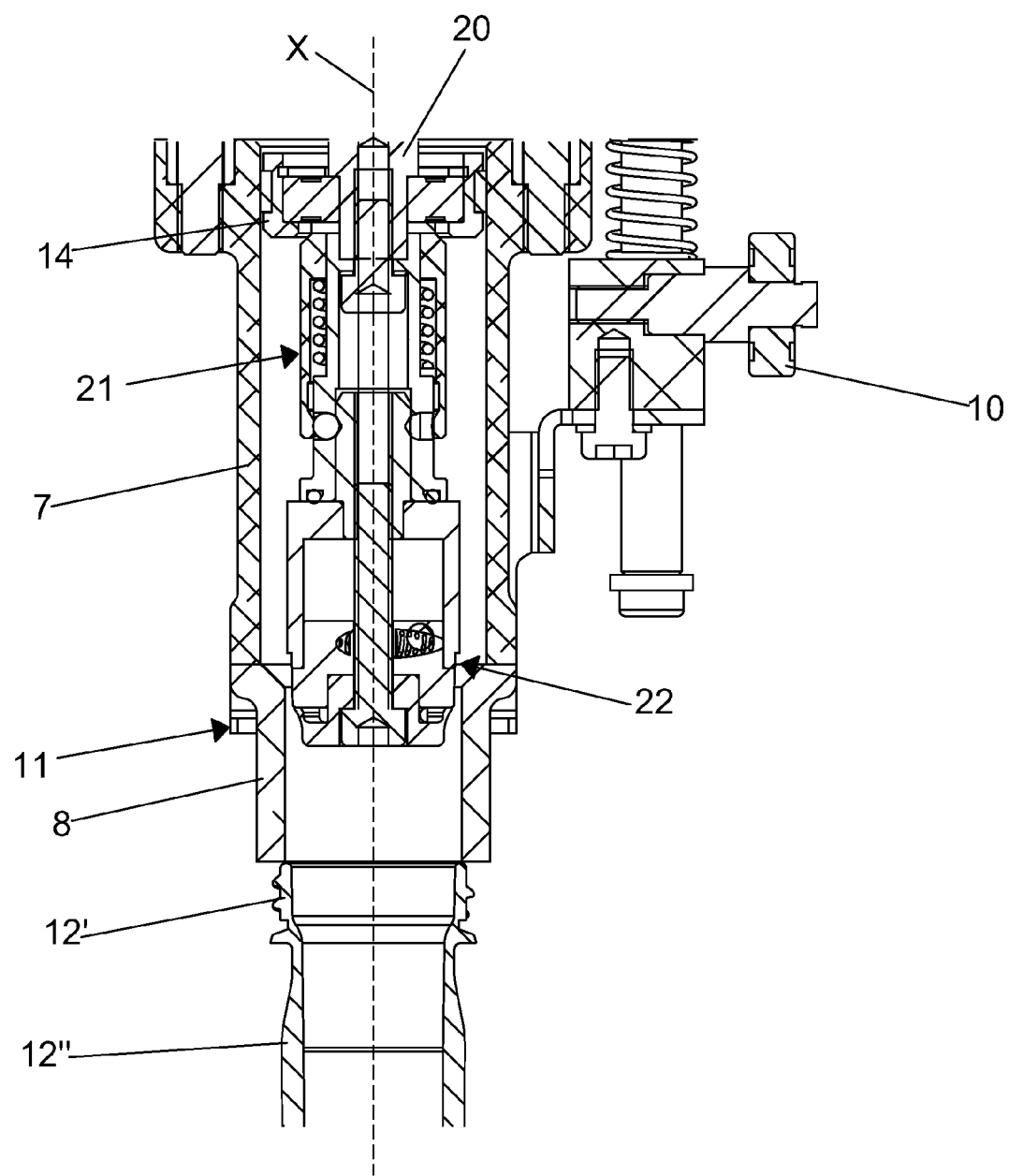
FIG. 4 depicts an enlargement of a part of the view in FIG. 3.

With reference to the figures, two embodiments are depicted of an apparatus for conveying containers made of plastic material, for example preforms made of PET (polyethylene terephthalate) or of any other suitable thermoplastic material.

Reference below is made to upper and lower only with reference to the arrangement of the apparatus shown in the figures, for better comprehension of the invention, but without any limiting intent for the invention. Furthermore, reference is made to a preform as a container made of plastic material, but this does not exclude the possibility of using the apparatus of the invention also for conveying substantially cylindrical-shaped containers other than preforms.

The conveying apparatus of the invention, in a first embodiment thereof shown in Figures from 1 to 4, comprises:

- a supporting frame 3 moveable along a track or cam surface, defining a path, and provided, for example laterally, with at least one sliding element 10', for example a wheel or other equivalent element, for sliding on said track;
- a longitudinal rod 20, defining a longitudinal axis X, sliding vertically along said axis X through guide-holes 24', 25' provided in the supporting frame 3;
- a gripping device or chuck 22, arranged at the lower end of rod 20, for picking and withholding a preform along the aforesaid path;
- a gripping device holding system 21, arranged at the lower end of rod 20 and over said gripping device 22, adapted to allow the removal and insertion of a gripping device which is different in shape;
- a first transmission element 1, arranged at the upper end of rod 20, for transmitting a translation motion to rod 20 along axis X;
- a second transmission element 2, arranged at the upper end of rod 20, for transmitting a rotation motion to rod 20 about axis X;
- adjustment means for adjusting the translation strokes of the longitudinal rod 20 and of the gripping device 22, so that the gripping device 22 can operate at three working levels or positions comprising a first resting position L0; a second gripping position L1, below the first position; and a third releasing position L2, above the first position;

possibly a moveable protection device 11, for protecting the neck of the preform from heating during the thermal treatment provided along said path, said protection device 11 being connected to the supporting frame 3 and adapted to translate vertically along axis X during the advancement of at least a second sliding element 10, for example a wheel or other equivalent element, along a further track or cam surface.

Said second sliding element 10 substantially has the function of a tappet capable of following a cam surface, not shown, which controls the vertical movement of the moveable protection device 11 during the operation of the apparatus, which is described below.

The supporting frame 3 has, preferably but not necessarily, a substantially C-shaped structure.

Body 23 of frame 3 is provided externally with a projection on which the sliding element 10' is accommodated.

There is provided a first guide-hole 24', coaxial to axis X, crossed by rod 20, on the upper arm 24 of the C shape of frame 3.

There is provided a second guide-hole 25', which is also coaxial to axis X and crossed by rod 20, on the lower arm 25 of the C shape of frame 3.

The first guide-hole 24' and second guide-hole 25' therefore have the same axis coinciding with the longitudinal axis X.

The longitudinal rod 20 has a central portion 15 with a smaller diameter than the diameter of the portions adjacent to said central portion, which is always coaxial to axis X. Such a central portion 15 is delimited by an upper abutment 15' and by a lower abutment 15", made on rod 20. The longitudinal extension of said central portion 15 is substantially equal to or smaller than the distance between upper arm 24 and lower arm 25 of frame 3 near axis X.

Advantageously, said adjustment means for adjusting the translation strokes of rod 20 comprise two annular elements 4, 6, arranged coaxially and outside the central portion 15 of rod 20, and first elastic means 5, for example a helical spring or other compression spring, the two ends of which are fixed to a respective annular element 4, 6 for keeping said annular elements 4, 6 abutting, in the resting position L0 of the apparatus, on the corresponding abutment 15' and 15" by means of the force generated by the spring itself. The inner surface of the annular elements 4, 6 is in sliding contact with the outer surface of the central portion 15 of the rod. During the movements of rod 20 along axis X, said rod slides inside one of said annular elements while the other annular element moves together with rod 20.

In particular, the two annular elements 4, 6 have an annular end projection 4', 6' having an outer diameter greater than the diameter of the guide-holes 24', 25'. Alternatively, the annular elements 4, 6 can be cylindrical and have no projection, rather have a greater diameter than the diameter of the guide-holes.

With this configuration, when rod 20 is in resting position, the annular projection 4', or the annular element 4 in general, abuts both on abutment 15' and on a flat surface of the upper arm 24 of frame 3; while the annular projection 6', or the annular element 6 in general, abuts both on abutment 15" and on a flat surface of the lower arm 25 of frame 3.

When rod 20 is translated downward along axis X, part of the central portion 15 is inserted in the guide-hole 25', the annular element 4 is lowered due to the effect of the upper abutment 15', while the annular element 6 remains stationary abutted on the lower arm 25 and rod 20 slides through said annular element 6.

If rod 20 is instead translated upwards along axis X, part of the central portion 15 is inserted in the guide-hole 24', the annular element 6 is raised due to the effect of the lower abutment 15", while the annular element 4 remains stationary abutted on the upper arm 24 and rod 20 slides through said annular element 4.

Advantageously, the configuration of the elastic means 5, restrained between the two annular elements 4, 6, is such that the maximum deformation dimension $c_{max}$ of the elastic means 5 is either equal to a quantity c1, which is the stroke of the annular element 4 in the case of downward translation of rod 20, or is equal to a quantity c2, which is the stroke of the annular element 6 in case of upwards translation of rod 20. In one variant, quantities c1 and c2 can be equal. In any case, the length of the strokes c1 and c2 must always be less than the distance between the two annular elements 4, 6 when rod 20 is in the resting position or level L0.

With regards instead to the moveable protection device 11, it is fixed in sliding manner below the outer end of the lower arm 25: for example, it slides on one or more columns 13, parallel to axis X and conveniently spaced therefrom, which are rigidly fixed to said outer end of the lower arm 25.

More specifically, the moveable protection device 11 comprises a structure 30 on which the sliding element 10 is fixed. Said structure 30 is fixed at the upper end thereof, in sliding manner, on the columns 13, preferably two, and is provided with an end plate 11' at the lower end thereof.

Said end plate or protection plate 11', for example rectangular in shape, is substantially orthogonal to axis X and has a hole 31, for example circular, which is larger than the largest outer size of the neck of the preform in orthogonal direction with respect to the longitudinal axis thereof. Therefore, hole 31 typically has a larger diameter than the outer diameter of the grip ring of the preform that projects the most. Thereby, the neck of a preform 12 can pass through hole 31 without any interference, while advancing along the longitudinal axis thereof.

The protection plate 11' is maintained in a lower position, called protection position, by second elastic means, such as for example at least one helical spring 9 wound about at least one column 13, with the two ends fixed to the lower arm 25 and to the sliding structure 30, respectively. In this lower position, plate 11' is at a height such as to separate and protect neck 12' of preform 12, which is withheld in position L0 by the gripping device 22, from the heat emitted by heating means, provided along at least one stretch of the path of the preforms, and facing body 12" of the preform. Thereby, the mechanical features—which are important features for the subsequent conveying step with the pincers—are kept of the neck of the preforms before their transformation into final containers in the drawing-blowing process. When the sliding element 10 is instead lifted by sliding along the respective cam surface, plate 11' is lifted into an upper position thus guaranteeing access to the preform by gripping means 40, which extract the preform from the conveying apparatus. The elastic means 9 are compressed in this upper position, between the sliding structure 30 and the lower arm 25 of the supporting frame 3.

Furthermore, this first embodiment of the apparatus of the invention also comprises an expulsion device, for expelling the preform from the gripping device, provided with:

a first tubular element 7, connected rigidly by means of the upper end thereof to the lower arm 25 of the supporting frame 3;

a second tubular element 8, fixed to said first tubular element 7 at the lower end thereof and surrounding the gripping device 22, and which lower flat edge is suitable for coming in contact with the upper flat edge of the preform to be conveyed—such a second tubular element can be customized according to the neck of the preform;

a guiding element 14 fixed at the lower end of rod 20, over the gripping device holding system 21, and sliding within the first tubular element 7 for axially and radially guiding the longitudinal rod 20 and the gripping device 22 of the preform. First tubular element 7, second tubular element 8 and guiding element 14 are coaxial to axis X.

First tubular element 7 and second tubular element 8 can also be made in a single piece or tubular element, with the guiding element 14 sliding inside said single tubular element.

Figure 5:
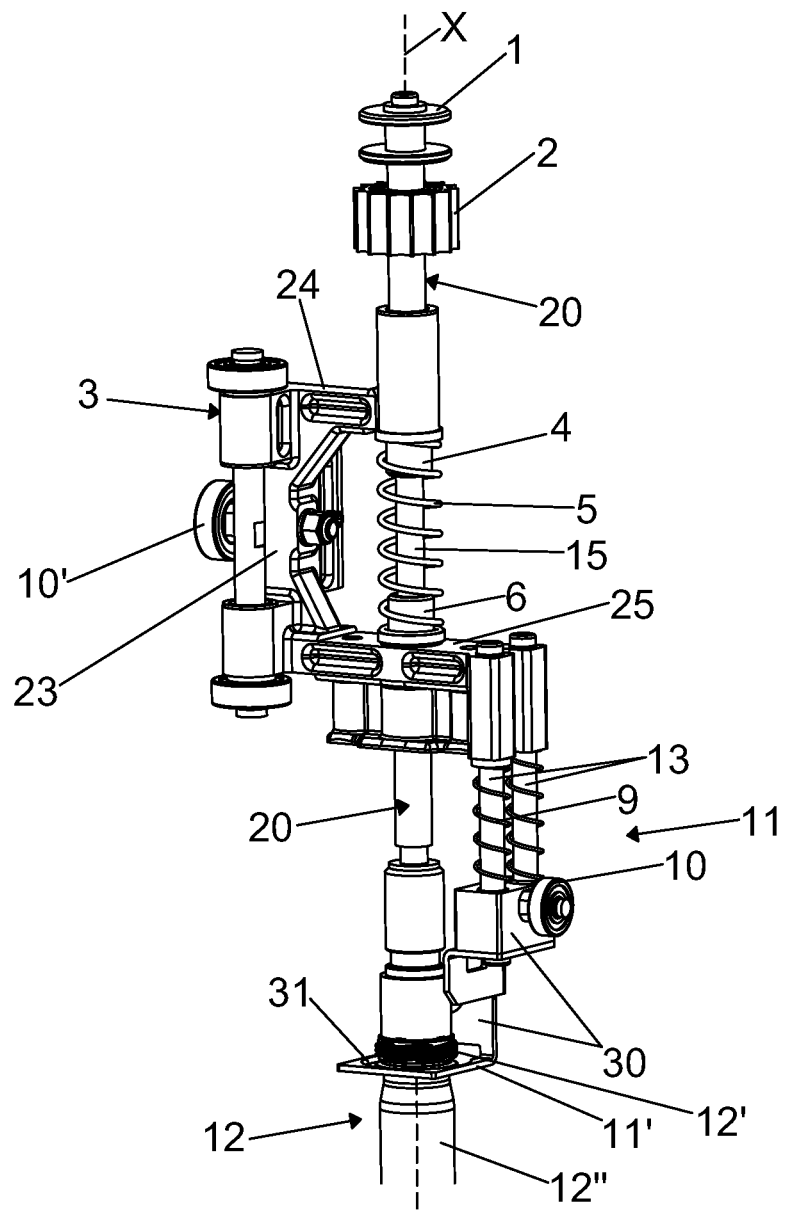
FIG. 5 depicts a first perspective view of a second embodiment of the apparatus according to the present invention.

With reference instead to FIG. 5, a second embodiment is depicted of the conveying apparatus of the invention, which is substantially equal to the first embodiment described above but which differs, with respect to said first embodiment, only in that it does not provide any expulsion device, that is the first tubular element 7, the second tubular element 8 and the inner guiding element 14. These last components are therefore to be considered optional within the scope of the present invention. It is possible to use one or the other embodiment depending on the requirements determined by the type of container to be conveyed, operating speeds, the desire to reduce costs, etc.

The second embodiment can also optionally provide the moveable protection device 11.

Figure 6:
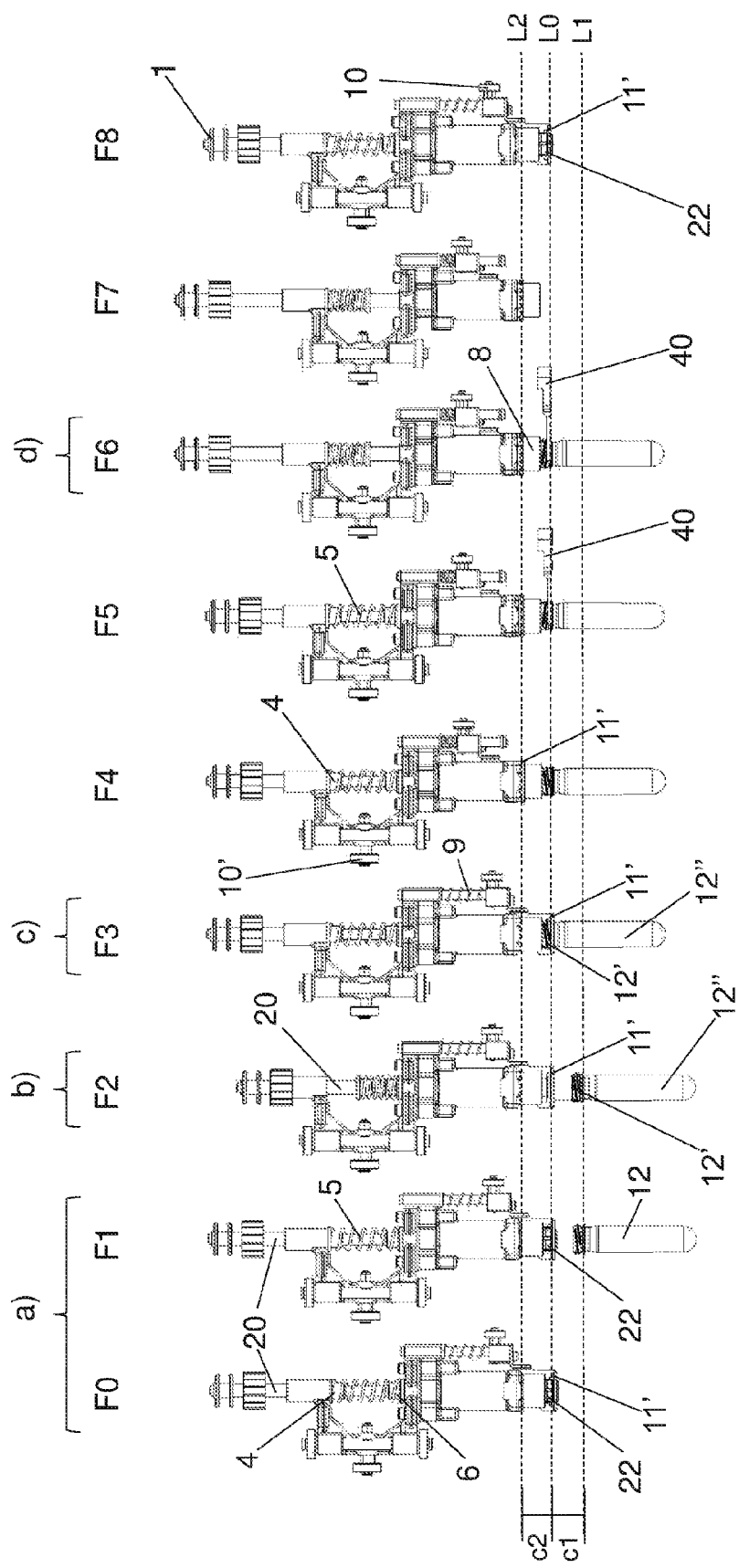
FIG. 6 depicts a succession of the operating steps of the apparatus in FIG. 1.

Below is a description of the operating steps of the apparatus of the invention, with reference to the first embodiment (FIG. 6).

Step 0: rod 20 is initially with the gripping device 22 at an intermediate level L0, or resting level, maintained in position by the annular elements 4, 6, held abutting on the supporting frame 3 and on the abutments 15, 15' of rod 20 due to the effect of the force exerted by the elastic means 5. The protection plate 11' is also at the resting level L0, in its lower position.

Step 1: preform 12 to be picked and conveyed is introduced in transverse direction to the longitudinal axis X of rod 20 and of the gripping device 22, for example resting on a transport star by means of the grip ring, the grip ring being at the gripping level L1, below the intermediate level L0.

Step 2: by acting on the transmission element 1 in vertical downward manner, rod 20 is lowered and travels a stroke c1 along axis X so that the gripping device 22 reaches the gripping level L1 where it engages inside the upper part or neck 12' of preform 12. In this situation, the annular element 4 is lowered by a length equal to a stroke c1 due to the effect of the upper abutment 15'; the annular element 6 instead remains stationary and in contact with the lower arm 25 of the supporting frame 3. Plate 11' remains at the resting level L0 in this step.

Step 3: by acting on the transmission element 1 in vertical upwards manner, rod 20 is lifted along axis X by a stroke c1, thus bringing the gripping device 22, and therefore preform 12, from the gripping level L1 to the resting level L0; the neck of the preform having crossed hole 31 of the protection plate 11'. In this step, the apparatus is in the same configuration as in steps 0 and 1 (level L0) and with the protection plate 11' (again at level L0) protecting the neck 12', which is over said plate 11', from the heat irradiated toward body 12" of the preform, which is instead below said plate 11'. In this configuration, the apparatus indeed slides by means of the at least one sliding element 10' on part of the track defining the path of the preforms, while crossing at least one thermal treatment zone of the preform at which preform 12 rotates about axis X by means of a rotation given to the transmission element 2 fixed on rod 20.

Step 4: A mechanical action on the sliding element 10, which rotates while sliding along the relative cam surface, lifts the protection device 11 alone, and therefore plate 11', with a stroke equal to c3, which is different from or equal to c1, until reaching its upper position. Thereby, the elastic means 9 are compressed and plate 11' is lifted until preform 12 is completely freed, thus nulling the separation effect of the preform into two parts. The gripping device 22 remains at the resting level L0 in this step.

Step 5: Once plate 11' no longer occupies the zone occupied by preform 12, which is withheld by the gripping device 22, gripping means 40, for example a pincer provided in a conveying device for extracting thermally-treated preforms, approach the conveying apparatus and grasp preform 12 at the neck of the preform, for example by being inserted into a specific groove provided between grip ring and threading of the neck. The gripping device 22 remains at the resting level L0 and plate 11' remains in its upper position in this step.

Step 6: By forcing an upwards translational movement on the transmission element 1 equal to a stroke c2, of length equal to or different from stroke c1, rod 20, and therefore the gripping device 22, is raised thus reaching level L2, which is called the preform unloading or releasing level. During this lifting, neck 12' of preform 12 pushes on the lower edge of the tubular element 8 which stops the rising thereof, whereby preform 12 disengages completely from the gripping device 22, thus being grasped by the gripping means 40. In this step, the elastic means 5 deform by a quantity equal to stroke c2 because the annular element 6 moves upwards by a quantity equal to c2 due to the effect of the lower abutment 15" of rod 20, while the annular element 4 is kept stationary and in contact with the upper arm 24 of the supporting frame 3. Plate 11' remains in its upper position in this step.

Step 7: The gripping means 40 move preform 12 away from the conveying apparatus.

Step 8: In this step, both the gripping device 22 and the protection plate 11' are brought back to the start position, that is the resting position L0, by traveling an inverse stroke equal to c2 and c3, respectively, carried out by forcing a vertical downward translation of the transmission element 1 and a descent of the sliding element 10 along the respective cam surface, respectively. According to requirements, this step can be divided into two different steps.

At the end of step 8, the apparatus of the invention is in the same initial configuration as step 0, that is ready to carry out the steps described above with a new preform.

Figure 7:
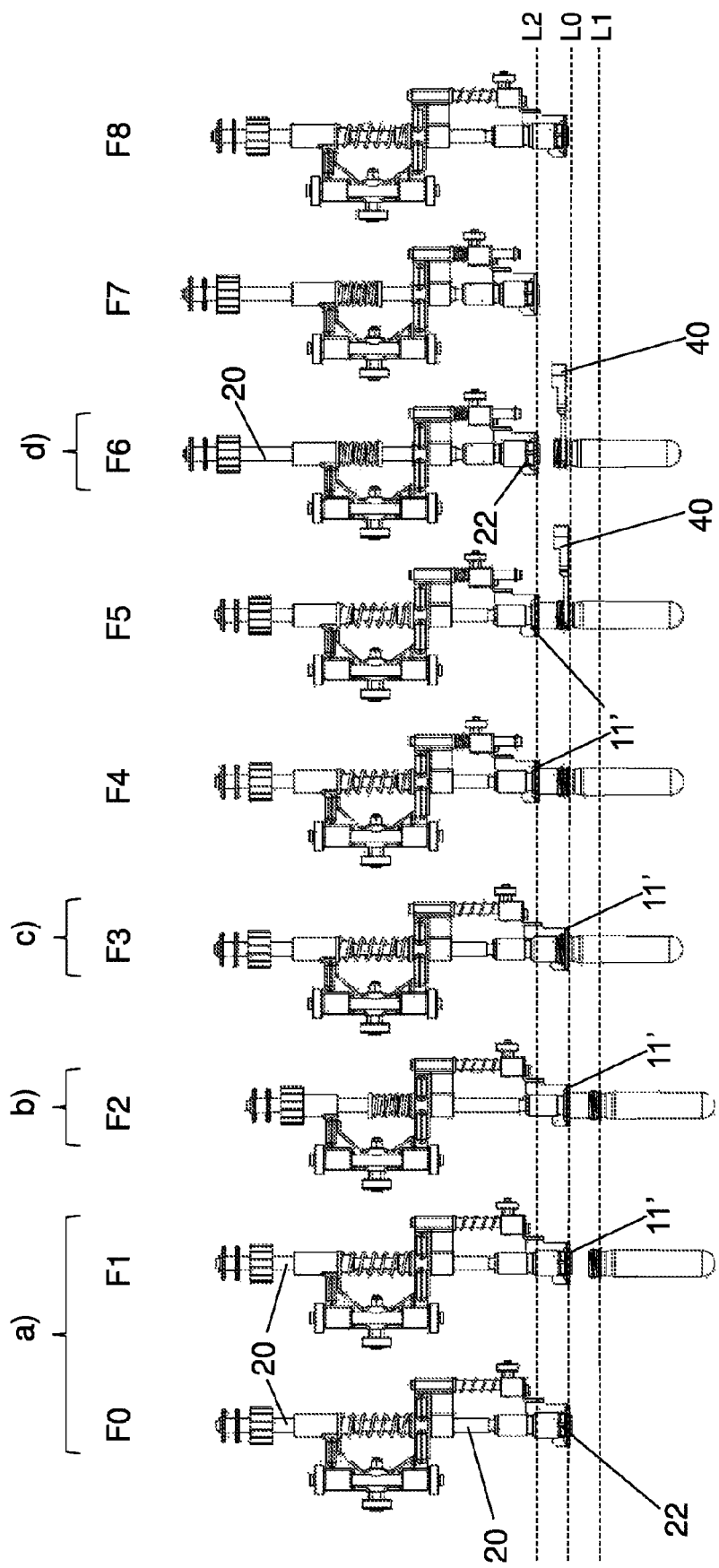
FIG. 7 depicts a succession of the operating steps of the apparatus in FIG. 5.

With reference to the second embodiment (FIG. 7), the operating steps of the apparatus of the invention are identical to the ones described above, except for step 6 in which rod 20, and therefore the gripping device 22, is lifted thus reaching the releasing level L2. Indeed, during this lifting in this variant, preform 12 is blocked directly and only by the gripping means 40 which act on a portion of the neck of the preform. Thereby, preform 12 disengages completely from the gripping device 22, thus remaining anchored to the gripping means 40; the elastic means 5 deform by a quantity equal to stroke c2 because the annular element 6 moves upwards by a quantity equal to c2 due to the effect of the lower abutment 15" of rod 20, while the annular element 4 is kept stationary and in contact with the upper arm 24 of the supporting frame 3. Plate 11' remains in its upper position in this step.

It is also possible for the resting position L0 of rod 20, and therefore of the gripping device 22, not to coincide with the lower position of plate 11'. These two positions are in any case near one another.

The invention claimed is:

1. An apparatus for conveying a container made of plastic material, in particular a preform for the production of a final container by means of a blowing operation, the apparatus comprising:
   a supporting frame slidable along a predetermined path, having a first arm and a second arm provided with a first guide-hole and a second guide-hole, respectively;
   a longitudinal rod defining an axis X, adapted to translate along said axis X and/or to rotate about said axis X through said first guide-hole and second guide-hole coaxial to the axis X;
   a gripping device, fixed to a first end of the longitudinal rod to pick and withhold an end of the container to be conveyed;
   wherein adjustment means are provided for adjusting translation strokes of the longitudinal rod and of the gripping device along said axis X, said translation strokes having a predetermined maximum length, said adjustment means being configured to allow a first downward translation of the gripping device, having a first stroke c1 from a resting position L0 to a gripping position L1 in which the container is gripped by means of said gripping device; a second translation of the gripping device together with the container upwards from said gripping position L1 to said resting position L0; and a third upward translation of the gripping device, having a second stroke c2 from said resting position L0 to a releasing position L2 for releasing the container from said gripping device.

2. The apparatus according to claim 1, wherein the longitudinal rod has a central portion having a smaller diameter than the diameter of the portions adjacent to said central portion, the central portion being delimited by a first abutment and by a second abutment, made on said longitudinal rod and wherein said adjustment means comprises
   two annular elements arranged coaxially and outside the central portion having an outer diameter greater than a diameter of said first guiding-hole and second guiding-hole, and
   first elastic means arranged between said two annular elements along the central portion, said two annular elements and said first elastic means being designed so as to maintain in position the gripping device in the resting position L0, when the longitudinal rod is not subject to translation along the axis X.

3. The apparatus according to claim 2, wherein, in said resting position L0, a first annular element abuts on said first abutment and/or on said first arm, and a second annular element abuts on said second abutment and/or on said second arm by means of a force generated by said first elastic means, wherein, in said gripping position L1, part of the central portion is inserted in the second guide-hole, the first annular element being lowered by the first abutment, and the second annular element abutting on the second arm and wherein, in said releasing position L2, part of the central portion is inserted in the first guide-hole, the second annular element being raised by the second abutment and the first annular element abutting on the first arm.

4. The apparatus according to claim 2, wherein the inner surface of the annular elements is in sliding contact with the outer surface of the central portion of the rod.

5. The apparatus according to claim 2, wherein the longitudinal extension of the central portion along axis X is either equal to or smaller than the distance between said first arm and said second arm.

6. The apparatus according to claim 2, wherein the configuration of the first elastic means is such that their maximum deformation dimension $c_{max}$ is either equal to said first stroke (c1), which is the stroke of the first annular element in the case of downward translation of the rod, or is equal to said second stroke c2, which is the stroke of the second annular element in case of upward translation of the rod.

7. The apparatus according to claim 6, wherein the length of the first stroke c1 and the length of the second stroke c2 are shorter than the distance between the first annular element and the second annular element when the rod is in the resting position L0.

8. The apparatus according to claim 1, wherein the length of the first stroke c1 is equal to the length of the second stroke c2.

9. The apparatus according to claim 1, wherein a moveable protection device is provided with an end plate having a hole which can be crossed by at least one part of the container and of the gripping device moving along said axis, said moveable protection device being connected in sliding manner to the supporting frame and adapted to translate parallel to said axis to move said end plate from a first position distal to the supporting frame to a second position proximal to said supporting frame.

10. The apparatus according to claim 9, wherein the resting position L0 is either near or coinciding with said first position of the plate end.

11. The apparatus according to claim 9, wherein the moveable protection device slides on one or more columns rigidly fixed to an end of the supporting frame, preferably to an end of the second arm.

12. The apparatus according to claim 11, wherein the moveable protection device comprises a structure fixed to a first end in sliding manner on one or more columns, and provided with said end plate on a second end thereof.

13. The apparatus according to claim 12, wherein the structure is provided with a first sliding element (10), adapted to slide on a cam surface, and there are provided second elastic means (9), arranged between said structure and the supporting frame, so that the end plate is maintained in its first position by said elastic means,
   and so that when said first sliding element is lifted by sliding along the respective cam surface, the end plate is lifted into its second position thus compressing said elastic means.

14. The apparatus according to claim 1, wherein a gripping device holding system is provided arranged at the second end of the rod and over said gripping device adapted to allow the removal and insertion of a gripping device of different shape.

15. The apparatus according to claim 1, wherein an expulsion device is provided for expelling the container from the gripping device, provided with:
   at least one tubular element, coaxial to axis X and surrounding the gripping device rigidly connected by means of a first end to the second arm and having a second end suited to come into contact with the upper edge of the container to be conveyed in the passage from said resting position L0 to said releasing position L2; and a guiding element fixed at the lower end of the rod and sliding within said at least one tubular element for axially and radially guiding the rod and the gripping device.

16. The apparatus according claim 1, wherein transmission means are provided for transmitting a rotary and/or translational motion to said longitudinal rod, said transmission means being integral with a second end of the longitudinal rod.

17. A conveying chain of containers made of plastic material comprising a plurality of links, each of said links being provided with at least one conveying apparatus claim 1.

18. An operating method of a conveying apparatus according to claim 1, wherein the following steps are provided:
  a) providing the longitudinal rod in the resting position L0;
  b) translating the longitudinal rod along the axis X downwards from said resting position L0 to the gripping position L1 in which the container is gripped by the gripping device;
  c) translating the longitudinal rod along the axis X upwards from said gripping position L1 to said resting position L0;
  d) translating the longitudinal rod along the axis X upwards from said resting position L0 to the releasing position L2 for releasing the container from said gripping device.

19. The method according to claim 18, wherein when a moveable protection device is provided having an end plate with a hole (31) which can be crossed by at least one part of the container and of the gripping device moving along said axis, said moveable protection device being connected in sliding manner to the supporting frame and adapted to translate parallel to said axis to move said end plate from a first position distal to the supporting frame to a second position proximal to said supporting frame, it is provided that:

the end plate is in its first position during step a);
  at least one end of the container crosses the hole (31) of the end plate in said first position in step b);
  the end plate translates along the axis X upwards from said first position to its second position to leave the zone of said end container clear between step c) and step d).

* * * * *